(12) United States Patent
White et al.

(10) Patent No.: US 10,248,696 B2
(45) Date of Patent: Apr. 2, 2019

(54) METHODS AND SYSTEMS FOR SEARCHING ENTERPRISE DATA

(71) Applicant: Cisco Technology, Inc., San Jose, CA (US)

(72) Inventors: Patrick White, San Francisco, CA (US); Shailesh Saini, San Francisco, CA (US); Jateen Joshi, San Francisco, CA (US); Vibhor Jain, San Francisco, CA (US); Carter Foxgrover, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 559 days.

(21) Appl. No.: 14/841,555

(22) Filed: Aug. 31, 2015

(65) Prior Publication Data

US 2015/0370861 A1    Dec. 24, 2015

Related U.S. Application Data

(63) Continuation of application No. PCT/US2014/020013, filed on Mar. 3, 2014.

(60) Provisional application No. 61/771,752, filed on Mar. 1, 2013.

(51) Int. Cl.
*G06F 17/30* (2006.01)

(52) U.S. Cl.
CPC .... *G06F 17/30528* (2013.01); *G06F 17/3053* (2013.01); *G06F 17/30345* (2013.01); *G06F 17/30554* (2013.01); *G06F 17/30616* (2013.01); *G06F 17/30634* (2013.01); *G06F 17/30867* (2013.01)

(58) Field of Classification Search
CPC .......... G06F 17/30867; G06F 17/3053; G06F 17/30958; G06F 17/30528
See application file for complete search history.

(56) References Cited

U.S. PATENT DOCUMENTS

| 2007/0106767 | A1 | 5/2007 | Yamamoto et al. |
| 2008/0243785 | A1 | 10/2008 | Stading |
| 2008/0247217 | A1* | 10/2008 | Ruf ..................... G11C 11/5614 365/148 |

(Continued)

FOREIGN PATENT DOCUMENTS

JP    2004287827 A    10/2004

OTHER PUBLICATIONS

International search report and written opinion dated Jun. 23, 2014 for PCT Application No. US2014/020013.

*Primary Examiner* — Amanda L Willis
*Assistant Examiner* — Vaishali Shah

(57) ABSTRACT

Methods and systems for searching enterprise data are provided. The method is for searching data and includes identifying edges associating data and/or people. The method also includes assigning a resistance value to an edge based on strength(s) of association, the resistance value being inversely related to the strength of the association. The method further includes forming a resistance graph connecting the user with the data and the people based on the values of the edges. Additionally, the method includes providing results for a search query from a user based on the resistance graph with lower resistance values being prioritized for the user.

21 Claims, 6 Drawing Sheets

(56) References Cited

U.S. PATENT DOCUMENTS

| | | | |
|---|---|---|---|
| 2009/0251322 A1* | 10/2009 | Escaich | A62C 3/08 |
| | | | 340/584 |
| 2010/0305998 A1* | 12/2010 | de La Torre Bueno | |
| | | | G06Q 10/06 |
| | | | 705/7.37 |
| 2011/0035464 A1 | 2/2011 | Dolin et al. | |
| 2011/0213785 A1* | 9/2011 | Kristiansson | G06Q 10/10 |
| | | | 707/748 |
| 2014/0108562 A1* | 4/2014 | Panzer | G06Q 10/10 |
| | | | 709/206 |

* cited by examiner

METHODS AND SYSTEMS FOR SEARCHING ENTERPRISE DATA

CROSS-REFERENCE

This application is a continuation application of PCT Application No. PCT/US14/20013, filed Mar. 3, 2014, which claims the benefit of U.S. Provisional Application No. 61/771,752, filed Mar. 1, 2013, each of which applications is entirely incorporated herein by reference.

BACKGROUND

There are various categories of search engine software, such as web search or full-text search (e.g., Lucene), database or structured data search (e.g., Dieselpoint), and mixed or enterprise search (e.g., Google Search Appliance). Web search engines can use hundreds of thousands of computers to process billions of web pages and return results for thousands of searches per second. High volume of queries and text processing may require the software to run in highly distributed environment with high degree of redundancy.

In modern search engines, searching for text-based content in databases or other structured data formats (e.g., XML, CSV, etc.) may present some special challenges. Databases may be slow when solving complex queries (e.g., with multiple logical or string matching arguments). Databases allow logical queries which full-text search may not (e.g., use of multi-field boolean logic). While there is no crawling necessary for a database since the data is already structured, it is often necessary to index the data in a more compact form designed to allow for faster search.

Additionally, keyword searches of the Internet typically involve web crawlers identifying words on webpages and indexing the webpages. Ranking algorithms may rank webpages based on commonality with one or more keywords. Additionally, ranking of webpages may be adjusted based on the number of connections to and from a webpage. Email data and file data may also be searched using keywords, and searched of document sets based on keywords is possible.

However, document set and email searches are based on static documents, and do not account for the ways in which documents are sent, edited, attached, emailed, or modified. Information relating to the use of a document is relevant to the importance of a document, but is not utilized in conventional keyword searches of enterprise systems.

SUMMARY

The present disclosure provides systems and methods for data searching, such as methods and systems for searching enterprise data utilizing resistance graphs. Systems of the present disclosure can impersonate a user during indexing and explicitly create one graph and one index per user. Security issues can be handled at the time of indexing. Systems provided herein can employ a hyper-personalized ranking engine for enterprise search.

Systems provided herein can advantageously provide highly personalized search results. Systems of the present disclosure can create a resistance graph that is individualized to a user, which can include connections between the user and other users and/or data. The resistance graph can be stored in a data storage unit (e.g., computer memory) and updated based on the user's interaction(s) with one or more documents (or data) and other users. The user can use a system of the present disclosure to get an incredibly personalized search experience using a resistance graph, which can be individualized for (or specific to) the user.

An aspect of the present disclosure provides a method for searching for data, comprising (a) accessing a data storage unit comprising data, wherein at least a subset of the data is associated with a user that is in an organization; (b) identifying connections that associate (i) data in the subset with the user, (ii) data in the subset with other data in the data storage unit, which other data is associated with one or more other users that are in the organization, (iii) the user with the one or more other users, and (iv) the user with the other data; (c) using a computer processor, assigning a resistance value to each connection identified in (b), which resistance value is based on and inversely related to a strength of association between data and/or users associated with a given connection among the connections identified in (b); (d) generating a resistance graph identifying (i) the user, subset of the data, at least a portion of the other data and the one or more other users, and (ii) the connections identified in (b); (e) conducting a search of the data storage unit directed to search criteria provided by the user; and (f) providing results of the search, wherein the results are sorted based on the resistance values assigned in (c). The data can include one or more documents or data within data.

Another aspect of the present disclosure provides a method for searching for data, comprising (a) accessing a data storage unit comprising data, wherein at least a subset of the data is associated with a user that is in an organization; (b) identifying connections that associate (i) data in the subset with the user, (ii) data in the subset with other data in the data storage unit, which other data is associated with one or more other users that are in the organization, (iii) the user with the one or more other users, and (iv) the user with the other data; (c) using a computer processor, calculating and assigning resistance values to the connections identified in (b), which resistance values are each based on and inversely related to a strength of association between data and/or users associated with a given connection among the connections identified in (b); (d) indexing the data based on the resistance values assigned in (c); (e) conducting a search of the data storage unit directed to search criteria provided by the user; and (f) providing results of the search, wherein the results are prioritized based on the resistance values assigned in (c).

Another aspect of the present disclosure provides machine executable code that, upon execution by one or more computer processors, implements any of the methods above or elsewhere herein.

Another aspect of the present disclosure provides a computer system comprising one or more computer processors and memory coupled to the one or more computer processors. The memory can comprise machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "FIG." and "FIGS." herein), of which:

DETAILED DESCRIPTION

Figure 1A:
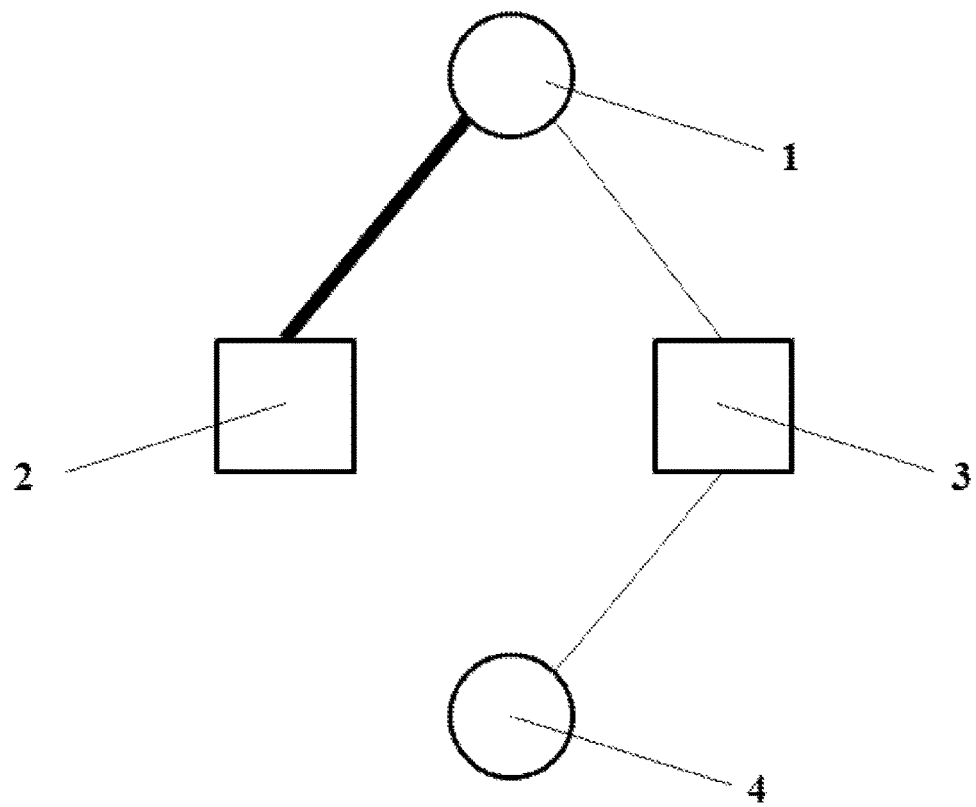
FIGS. 1A-1B show resistance graphs, in accordance with some embodiments of the present disclosure.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "document," as used herein, generally refers to any electronic medium that is configured and adapted to store data or information, such as audio, graphical and/or textual information. Non-limiting examples of data include customer data, account data, invoice data, bill data, product data, timesheet data, emails, attachments, image files, audio files, music files, video files, text documents, presentations, spreadsheets and database files. A document can be a text file, email, contact, image file, sound file (e.g., music file), or video file, or any other medium that is configured and adapted to contain information. A document can provide, for example, a lead, opportunity, invoice, wild page, company record, or web page. A document can store multiple types of data. In some examples, a document is any medium that can store one or more types of files, such as text files, image files, sound files or video files.

The term "connection," as used herein, generally refers to a link between a user and a document, a user and another user, or a document and another document. The link can be a virtual link. A connection can have a resistance. The value of the resistance can change based on the manner in which a user interacts with another user and documents. A higher resistance generally indicates a weaker connection than a lower resistance, which generally indicates a stronger connection.

The term "node," as used herein, generally refers points in a resistance graph. A node can be a user or data, such as a document.

The term "edge," as used herein, generally refers to a connection between nodes.

Methods for Searching for Data

An aspect of the present disclosure provides methods for searching for data. In some embodiments, a method for search for data comprises accessing, using a computer system, a data storage unit comprising data. The computer system can have features and components described elsewhere herein (see, e.g., FIG. 5). At least a subset of the data can be associated with a user. In some cases, at least some but at most the subset of the data is associated with the user. Next, the computer system identifies connections that associate (i) data in the subset with the user, (ii) data in the subset with other data in the data storage unit, which other data is associated with one or more other users, (iii) the user with the one or more other users, and (iv) the user with the other data. Using at least one computer processor of the computer processor, a resistance value is assigned to each identified connection. The resistance value is based on and inversely related to strength(s) of association between data and/or users associated with a given connection among the identified connections identified.

Next, a resistance graph is generating identifying (i) the user, subset of the data, at least a portion of the other data and the one or more other users, and (ii) the identified connections. The resistance graph can be presented on a user interface of an electronic device of the user. Alternatively or in addition to, the data is indexed based on the assigned resistance values. The indexing can enable rapid and efficient searching of the data upon a search directed to at least some of the data.

The computer system can be used to conduct a search of the data. The search can be directed to search criteria provided by the user. For instance, the user can input the search criteria in to a user interface of an electronic device of the user in communication with the computer system. The search criteria (or search query) can include one or more keywords, which can include a character (e.g., text) string.

Upon conducting the search, the results of the search can be provided to the user. The results of the search can be provided on an electronic device of the user, which can include a user interface (UI), such as a graphical user interface (GUI), for presenting the results.

In some cases, the results are sorted or prioritized based on the resistance values assigned in (c). For instance, data associated with connections having lower resistance values can be prioritized higher than data having higher resistance values. In some cases, the results are provided in a list, in which case results of higher priority can be provided towards the top of the list and results of lower or no priority can be provided towards the bottom of the list. Results of intermediate priority can fall between the top and the bottom of the list. As an alternative, the results can be presented in other formats, such as, for example, tree view.

In some cases, only results having a certain degree of importance to the user are presented to the user. Such degree of importance can be configured by the user or learned by the computer system upon the user interacting with the computer system. For example, the user can instruct the computer system to only present results that are at least 10%, 20%, 30%, 40%, 50%, 60%, 70%, 80%, 90%, or 95% relevant to the search criteria. As another example, the computer system can learn that the user wishes to only view results that are at least 10%, 20%, 30%, 40%, 50%, 60%, 70%, 80%, 90%, or 95% relevant to the search criteria (e.g., by learning from which results the user elects upon viewing the results of previous searches).

The computer system can be programmed to determine which other users and data are of a given level of degree of priority to the user. Such determination can be made using a profile of the user, in which the user can specific which user or data, or type of data, is of high priority to the user, for example. Such determination can also be made using a guided questionnaire presented by the computer system to the user, in which the computer system presents one or more questions to the user and determines which other users and data are of a given level of degree of priority to the user using the responses to the questions. Such determination can also be made using a machine learning algorithm in which the system systematically monitors the user's behavior (e.g., communication to/from users and data access) to determine which other users and data are of a given level of degree of priority to the user. The machine learning algorithm can be of one or more types selected from supervised learning, unsupervised learning, semi-supervised learning, transduction, reinforcement learning, learning to learn, and developmental learning. Examples of machine learning algorithms include rain forest learning, decision tree learning, association rule learning, artificial neural networks, inductive logic programming, support vector machines, clustering, Bayesian networks, reinforcement learning, representation learning, similarity and metric learning, and sparse dictionary learning. Such algorithms can be implemented by way of software stored in memory and executed by one or more computer processors. Such machine learning algorithms can be employed to set the resistances of various connections at an individual (e.g., user) level.

The results of a search can comprise at least a portion of the subset of the data. In some situations, the results further comprise at least a portion of the other data in the data storage unit.

The data can be any electronic data, such as documents. In some examples, the data includes textual, audio, graphical and/or video data, or compressed data, such as collections of data (e.g., Zip or archive files). The data can include electronic communications, such as electronic mail (email) and/or recordings. The data can include one or more documents within another document. The data can include metadata.

The computer system can search for any type of data, such as files, documents, as well as other media that are configured and adapted to store information. Non-limiting examples of data include customer data, account data, invoice data, bill data, product data, timesheet data, emails, attachments, image files, audio files, music files, video files, text documents, presentations, spreadsheets and database files.

The search can be conducted on the data storage unit, which can be directly coupled to the computer system, remotely located with respect to the computer system, part of the computer system, or located in a distributed computing environments, such as, for example, the cloud.

Connections to other users can be identified in various ways. For instance, connections can be determined by identifying which users have access to given data in the data storage unit. For example, if user A and user B both have access to document A, then user A and user B may be connected through document A. In some cases, connections are determined using a contact list (e.g., address book) of the user, which can help the computer system identify contacts of the user. As an alternative or in addition to, connections can be determined using social network providers (e.g., Facebook®, Google+®, LinkedIn® or Twitter®). In some cases, contacts can be determined using a customer relationship management (CRM) system.

The system can monitor a user's contacts as they evolve based on communications to and/or from the user and other users. Such communications can include email, instant messaging (IM) communications, and social network posts (e.g., Tweets, wall posts or newsfeeds).

A connection can have a given resistance. The resistance of a connection between a user and another user can be a function of the degree of separation between the user and the other user. The degree of separation can be a one degree separation, two degree separation, three degree separation, or n degree separation, wherein 'n'−1 is the number of intervening users between the user and the other user. In some examples, if the user has a one degree separation with the other user, then the resistance of the connection between the user and the other user can be lower than if the user had a two degree separation with the other user. The resistance of the connection can be inversely related to the degrees of separation.

In some cases, as the user or other users interact with each other and data in the data storage unit, the resistances associated with identified connections may change. For example, a given document that was at one point of low priority to the user (e.g., rarely accessed) may become a high priority document if the user starts accessing the document routinely. To maintain connections with up-to-date resistance, the computer system can update the resistances of connections continuously, semi-continuously, periodically, or manually (i.e., upon user request). The system can learn from such interactions (e.g., using machine learning) to set and update resistances.

Resistances of connections can be calculated by the computer system and stored in memory and accessed by the computer processor to determine the relevance and/or priority of search results to the user. The resistances can be stored in memory. In an example, the resistances are maintained in a look-up table in memory. As another example, the resistances are maintained in a data file, such as metadata. Initially, a default resistance (e.g., 20) can be provided for all connections, and such resistances can be updated based on how users interact with each other and data, as describe herein. In some situations, the initial pass at setting resistance values (i.e., in a generic way) can be done using predefined or predetermined resistances for given connections to nodes. For example, a connection for a sent email can be determined to have a lower resistance than a connection for a received email.

The user can be in the same group, organization, enterprise, or other common entity as the one or more other users. For example, the user and the one or more other users can be part of the same company or school, or business enterprise. The search can be directed to data that is internal to a group, organization or enterprise.

The computer system can index data and update indexes based on how the user or the one or more other users interact with each other and the data, including the subset of the data. The index can be a data structure that improves the speed of data retrieval operations on a database table at the cost of additional writes and the use of more storage space to maintain the extra copy of data. Indexes can be used to quickly locate data without having to search the entire data storage unit (e.g., every row in a database table in the data storage unit) every time the data storage unit is accessed. Such indexes can be created using one or more columns of a database table (e.g., lookup table) in the data storage unit, providing the basis for both rapid random lookups and efficient access of ordered records.

An index can be stored in a data storage unit, such as memory. Such data storage unit can be separate from or the same as the data storage unit comprising the data.

An index of the present disclosure can be a copy of select columns of data from a table that can be searched very efficiently, which can also include a low level disk block address or direct link to the complete row of data it was copied from. In some cases, the data storage unit can allow indices to be created on functions or expressions. As an alternative or in addition to, the data storage unit can permit the use of filtered indices, where index entries are created only for those records that satisfy some conditional expression. In some cases, the data storage unit can index on user-defined functions, as well as expressions formed from an assortment of built-in functions. In some cases, the system employs a normalized model, and different indexing strategies can be employed for different types of entities and various properties of entities. Various elements of a given document (or data) can be indexed differently. For example, the body of an email can be indexed very similarly to the body of a document. However, the "from" email address on the email can be structure data and can be indexed as a whole, and may not be tokenized and broken up. Such indexing can enable the system to set resistances based on various elements of a given document.

Documents (or other data) can be stored as nodes, and connections can be generated between the documents using a computer processor. Such documents can be associated with one or more users. Once connections have been generated, the nodes can be searched based upon a search query inputted by a user. The search query can include one or more keywords, which can include a text string. The results of the search can be presented based on the strengths of the connections between nodes. Stronger connections may be displayed towards the top of a list, while weaker connections may be displayed towards the bottom of the list.

For example, the user can input a search query into a search field of a user interface of an electronic device of the user that is computed to the computer system. The computer system can then search the data storage unit and generate one or more results of the search. The results can be sorted or otherwise prioritized and returned to the user interface of the user.

Methods and systems of the present disclosure can be used to search for various types of documents (e.g., emails) in a data storage unit, as well as other systems and data. For instance, a keyword search can be directed to a CRM system (e.g., Salesforce®) or a customer support ticketing system (e.g., Zendesk®), and many other systems that may be integrated with systems of the present disclosure.

Systems provided herein can relate to any data in an enterprise data solution. References throughout this application to documents, emails and/or items can refer to any data (including enterprise data). Systems of the present disclosure can be used with any type of data storage unit, including enterprise systems.

In some searches, systems provided herein can use information relating to the use and evolution of a document to provide hyper-contextualized search results. Activity on an enterprise system, including emails, editing, sending or reviewing a document (or other data), or any other activity on an enterprise system, can be used to create a resistance graph (also "graph" herein). Each connection between a user and a document, or a document and another document or email, or any other possible connection, can have a resistance. Higher resistances indicate lower connectedness, and lower resistances indicate higher connectedness. Each connection is initially populated with a predetermined or default resistance (e.g., 20), which can be updated continually, semi-continually or at pre-determined intervals, such as based on system level events. For example, the resistance of a connection can be updated every 24 or 48 hours.

A graph for each user may be constructed by the system, continuously or periodically, and may be reduced continuously or periodically to a resistance between a user and each other user and each document or email in a system. The reduction can be performed using resistances and nodes, as discussed elsewhere herein. When the user performs a keyword search using systems provided herein, all candidate documents satisfying the keyword search (e.g., having the keyword or an identifiable variation of the keyword or keywords) are used to populate the results. The results may be displayed on a user interface (UI) of an electronic device of a user, such as a graphical user interface (GUI). Then the results are ranked, sorted or otherwise configured based on connections and resistances between the candidate documents (or other data) and the user, with results having lower resistances indicating higher connectedness being ranked higher. The ranked results are outputted to the user (e.g., on the UI), enabling the user to select a document.

The system can monitor user activity to update connections. The system can monitor user activity with respect to other users and/or documents (or other data) in the system to determine whether the user has a given degree of interaction with a user and/or document. For example, if the user interacts with a first user more frequently than a second user, then the system can determine that the connection between the user and the first user has a lower resistance than the connection between the user and the second user. If the user interacts with a first document more frequently than a second document, then the system can determine that the connection between the user and the first document has a lower resistance than the connection between the user and the second document. Such resistances can be updated based on the manner in which the user interacts with other users and documents.

The system can monitor the activity between the user and other users by monitoring the communications between the user and the other users within an organization (e.g., business enterprise) and/or external to the organization. For example, the system can monitor email traffic within the organization, or monitor which documents users have accessed. This can enable the system to determine which other users the user frequently communicates and collaborates with, which can enable the system to identify users of a given (e.g., high) degree of priority to the user. The system can monitor which users a given users has given access rights with respect to a given document. For example, if the user has granted the first user access to a document but not the second user, then the system can determine that the connection between the user and the first user has a lower resistance than the connection between the user and the second user. The system can also determine that the connection between the user, first user and the document has a lower resistance than the connection between the user, second user and the document. As another example, the system can monitor social network traffic, such as communications between social network users, social network wall posts and social network newsfeeds. In some cases, the system uses metadata from various other systems to determine and/or update resistances. For instance, Box® provides very rich metadata (e.g., as part of an API call) about what users created a document, what user has edited the document, etc. The system can use such metadata to determine and/or update resistances.

Connections in the system may be identified, modified, increased and/or reduced based on a resistance model in which higher values indicate higher resistances and more distant or tenuous connections between documents (or other data), and lower values indicate lower resistances and closer connections between documents. Connections in series can be added, while connections in parallel can be inversed, then added, and then inversed. That is, the overall resistance (Req) of connections in series is calculated by the relationship Req=R1+ . . . Rn, where 'R1' and 'Rn' resistances of connections in series, and 'n' is the total number of connections in series, which can be at least 2. Req of connections in parallel is calculated by the relationship Req=1/{(1/R1)+ . . . (1/Rn)}, where 'R' and 'Rn' are resistances of connections in parallel, and 'n' is the total number of connections in parallel, which can be at least 2. More complicated relationships can be broken down into sub-parts, either series or parallel, and reduced to a ghost or shadow edges having a resistance based on the relationship (e.g., series or parallel). Shadow edges may then be combined with parallel edges or parallel ghost edges in the same manner as normal edges. Likewise, shadow edges may be combined with other edges in series, both real and ghost, to make a combined shadow edge. In some cases, the system can employ a map/reduce method, which takes a complex, multi layered graph and reduces it to a single depth graph.

FIG. 1A schematically illustrates a resistance graph showing a first user 1 connected to a first document 2 and second document 3. The documents 2 and 3 are connected to a second user 4. The connections are shown by solid lines between the first user 1 and documents 2, 3, and between the second user 4 and second document 3. The connection between the first user 1 and first document 2 has a higher resistance than the connection between the first user 1 and second document 3. This may be because the first user 1 accesses the second document 3 more frequently than the first document 2.

The second user 4 is not directly connected to the first document 2, but is indirectly connected to the first document 2 through the first user 1. However, if the second user 4 does not have access rights (e.g., read rights or read/write rights), then the system may not present the first document 2 to the second user 4 upon a search.

In some cases, if a node or connection appears on a user's graph, it is because the system has access to it. Thus, the first document 2 may not appear on the graph of the second user 4. However, even though the second user 4 has not interacted with the first document 2, because the first user 1 has interacted with the first document 2, the first document 2 gets a boost in ranking (hence, lower resistance). For example, if the first user 1 and second user 4 frequently email each other, then the system can determine that the first document 2 is important to the second user 4 and incorporates such determination in its ranking of documents.

Figure 1B:
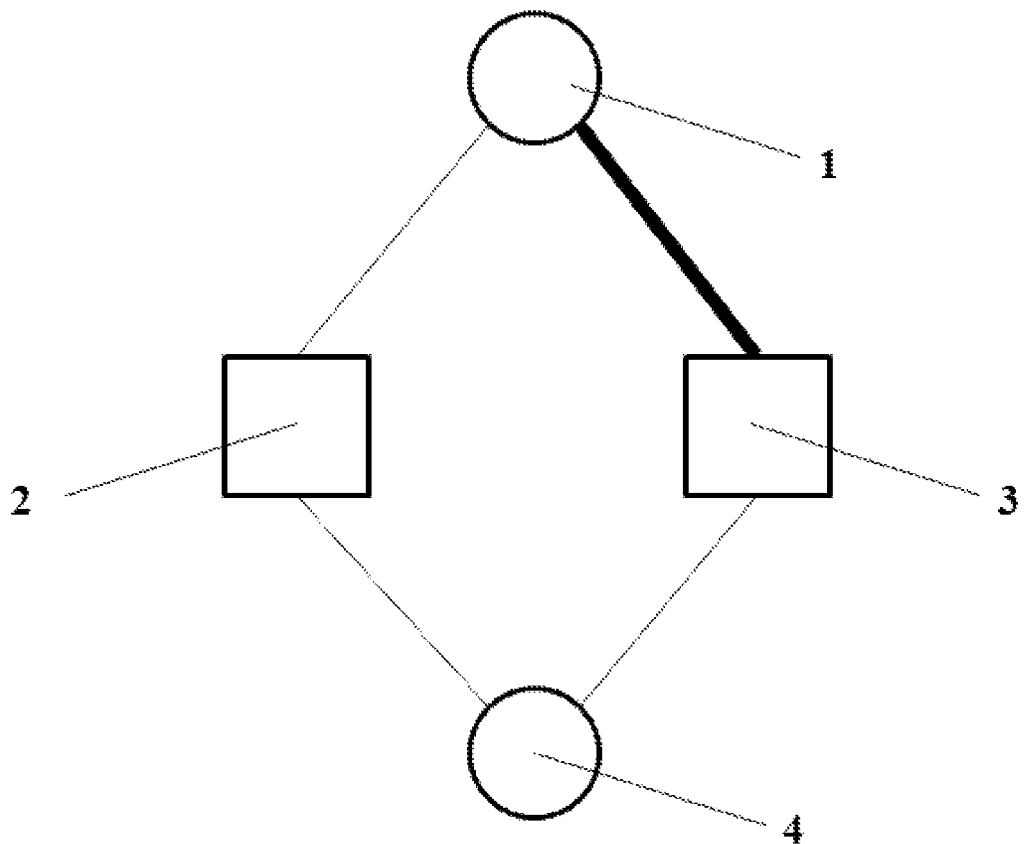

Connections between users and documents can be updated. In FIG. 1B, the second user 4 has been granted access rights to the first document 2, and the graph shows a connection between the second user 4 and the first document 2. This connection can have a default resistance value (e.g., 20), which can be updated based on, for example, how frequently the second user 4 accesses the first document 2. The connection between the first user 1 and the first document 2 now has a lower resistance than the connection between the first user 1 and the second document 3.

Figure 2:
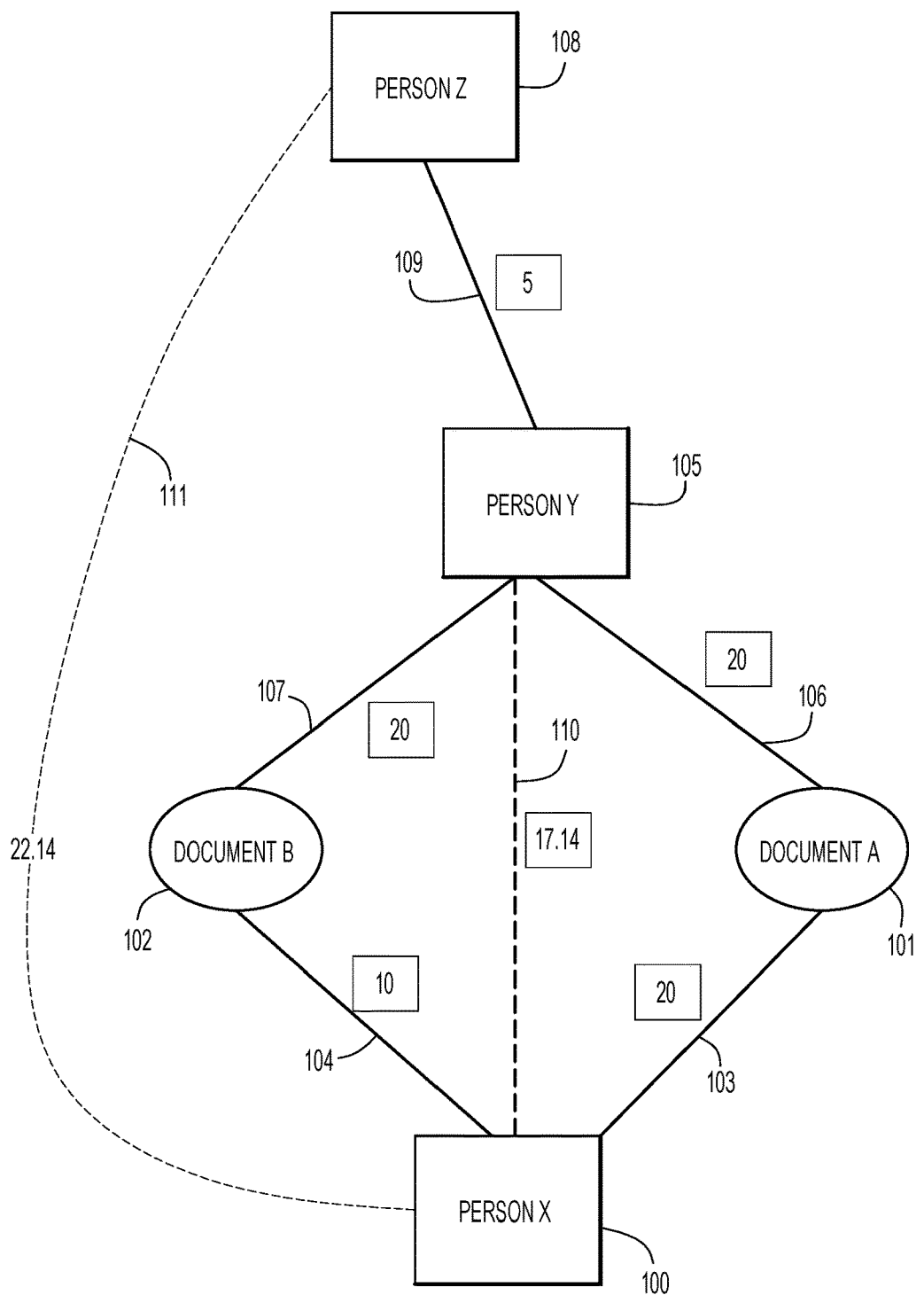
FIG. 2 illustrates a resistance graph showing nodes and connections between the nodes, in accordance with some embodiments of the present disclosure.

Parallel connections from a user to a first document may be individually weaker than a single connection to a second document from the user, which can cause the first document to be ranked higher in a keyword search in which both the first document and second document satisfy the keyword search criteria. For example, in FIG. 2 Person X 100 may be performing a keyword search of enterprise documents, which may be emails, contacts, attachments, or any other document or media. Person X may be connected to two documents, Document A 101 and Document B 102. A default resistance (or weight), for instance 20, may be assigned to the connection 103 connecting Document A 101 and Person X 100, and a resistance of 10 may be assigned to the connection 104 connecting Document B 102 and Person X 100. The different resistances between Person X 100 and Document A 101 and Document B 102 may be due to any one, two or all of (i) prior actions of Person X 100 with respect to Document A 101 and/or Document B 102, (ii) the types of connections between Person X 100 and Document A 101 versus the type of connection between Person X 100 and Document B 102, and (iii) the type of documents associated with Document A 101 and Document B 102. In some examples, the strengths of resistances of the connections 103 and 104 are due to (i), (ii) or (iii); (i) and (ii), (i) and (iii), or (ii) and (iii); or (i), (ii) and (iii). Other numbers may be assigned to these connections 103 and 104, and may be assigned based on previous usage or user preferences. Document A 101 and Document B 102 may each connect to Person Y 105 with connections 106 and 107 each having an assigned weight (or resistance) of 20. Person Y 105 may be connected to Person Z 108 with a connection 109 having a weight of 5. The connection from Person X 100 to Person Y 105 via Document B 102 (X-B-Y) is a series connection, and therefore the resistances of the connections 104 and 107 between Person X 100 and Person Y 105, or 10 and 20, respectively, can be added to yield an overall resistance of 30 connecting Person X 100 to Person Y 105 via Document B 102. The connection from Person X 100 to Person Y 105 via Document A 101 (X-A-Y) is also a series connection, and therefore the resistances of 20 and 20 are added to provide an overall resistance of 40. These two connections, X-B-Y and X-A-Y, are in parallel, and therefore the connection from Person X to Person Y may be reduced to one connection, shown as a dotted line (or shadow connection) 110, having a resistance of $(\frac{1}{30}+\frac{1}{40})^{-1}=17.14$. This shadow connection 110 may be added to the resistance (5) of the connection 109 between Person Y 105 and Person Z 108 since it is a series relationship, leading to a total resistance for a shadow connection 111 between Person X 100 and Person Z 108 of 5+17.14=22.14. Resistances of connections between documents and users (or persons) may thus be calculated by series and parallel connections to yield resistances of various values.

For nodes that are directly connected and indirectly connected through other nodes, resistances can be calculated as net resistances using parallel connectivity. For example, Person X 100 and Document A 101 are directly connected through connection 103, and connected indirectly through connection 104, Document B 102, connection 107, Person Y 1-5, and connection 106. The net resistance for the connection between Person X 100 and Document A 101 can be calculated as $(\frac{1}{20}+1/(10+20+20))^{-1}=14.29$. The net resistance for the connection between person X 100 and Document B 102 can be similarly calculated as $(\frac{1}{10}+1/(20+20+20))^{-1}=8.57$.

Figure 3:
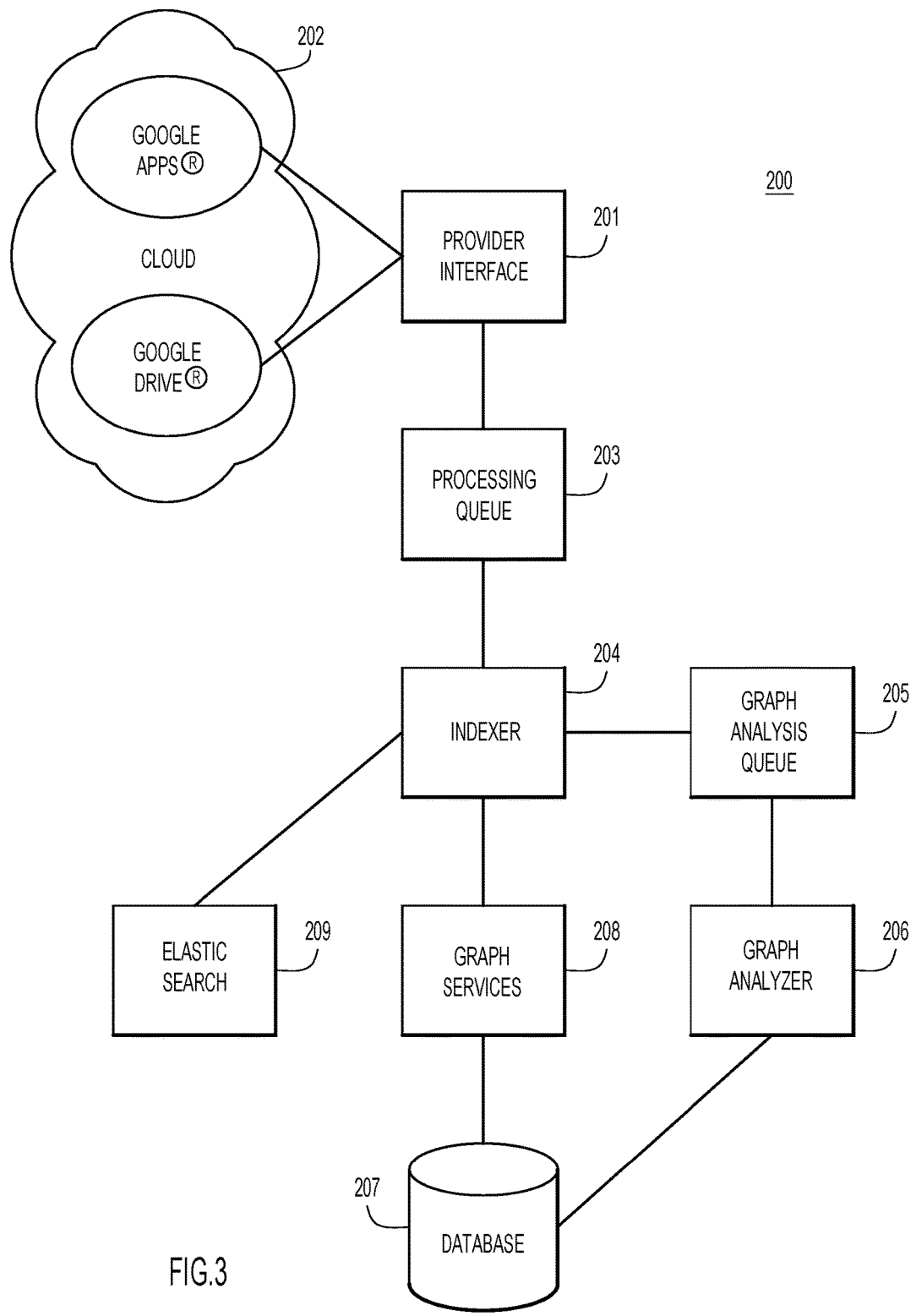
FIG. 3 is a computer system that is programmed or otherwise configured to implement methods provided herein.

FIG. 3 illustrates a computer system 200 that is programmed or otherwise configured to implement methods provided herein. The system may interact with one or more third party enterprise and/or cloud-based data systems, for example Google Apps® and Google Drive®. Other examples of third party systems that may be employed for use with the present technology include Salesforce®, any email system (e.g., Gmail® and Microsoft® Outlook®), and any other document management system, including distributed computing systems (e.g., cloud service or provider). A provider interface 201 provides a connection to a cloud service 202 to accesses information (e.g., documents) in a cloud provided by the cloud service 202. Such information can then be inserted into a processing queue module 203. From the processing queue module 203, the information is indexed in an indexer 204 to identify words and metadata associated with each document or other item retrieved from the cloud service 202. The indexer 204 is coupled to a graph analysis queue 205, which queues items for a graph analyzer module 206. The graph analyzer module 206 can identify connections and connection types associated with the information in the indexer 204. Such information can be stored in a database 207. A graph services module 208 is coupled the indexer 204 and the database 207. The graph services module 208 can populate a graph with predetermined resistances based on connection type(s), and then reduce that graph using the electrical resistance model discussed herein to determine connection strength(s) (also referred to as resistances or affinities). The connection strength(s) may be used to rank documents satisfying a keyword search.

The indexer 204 is coupled to an elastic search module 209, which can be used to perform keyword searches on the data stored in the indexer 204 using an elastic search algorithm or other multitenant-capable full-text search algorithm. Alternatively or in addition to, other keyword search algorithms may be used. The provider interface 201, processing queue module 203, indexer 204, graph analysis queue 205, graph analyzer 206, database 207, graph services module 208 and elastic search module 209 can be part of an integrated search system, such as an enterprise search system. The elastic search module 209 can be a sub-system (e.g., Mongo database or SQL) that enables the storage of information and using keyword indexes to permit searching. The keyword indexes can be created by the elastic search module 209. The elastic search module 209 can use elastic search keyword searching to filter out the search results (e.g., documents) that a user may not be interested in, and subsequently apply a ranking algorithm (e.g., using resistances, as described herein) to sort the results.

The present technology may use a graph search, and may use information relating to determining what the connections should be, and then how to convert from edges (i.e., connections, or lines between nodes) and resistances. A master list may indicate how an edge (e.g., "This person sent this email") can map to a given resistance (e.g., a resistance of 5). The master list can be a lookup table, for example. Additionally, users are provided with the ability to modify their own resistance level matrix and integrate their own default numbers into a resistance graph. Alternatively, a survey or questions may be presented to a user to determine a relative importance of various connections and/or people to assist in determining resistances for a personalized graph of the user. The survey can be provided in the form of a guided questionnaire (e.g., questions and answers), which can be used to determine a user's resistance preferences. In this manner, a user placing a higher importance on electronic communications (e.g., emails and text messages) from or to themselves, and/or including or not including attachments, may modify their resistance graph based on their preferences.

The present disclosure provides deep intelligence into data systems. For example, a search system of the present disclosure can recognize that email A is an email in Salesforce® and email B is an email in Gmail®, and the system may build an edge from each email to the respective senders, recipients, and any attachments (e.g., attached documents). Additionally, if the system has data indicating that, for example, person Y owns contact D at Salesforce®, the system can build an edge from person Y to contact D. Such data can be located in an electronic address book of person Y, which can include identifying information of contact D. The system can enable a user to build connections to other users (or connections).

As a user interacts with the data in the graph, additional edges maybe added, and the graph may be modified to account for what the user indicates matters most based on their interactions with an enterprise system and/or based on their interactions with nodes. For instance, if after searching a user consistently elects the email(s) listed, then the system may adjust downward the resistance used for that user for connections to and from emails generally. If a particular item is consistently selected out of rank order, that particular item may increase in importance by having the resistance between that item and the user reduced by the system. Further, the selecting of the item itself makes an additional connection, which can also reduce a net resistance between the user and the item by making a parallel connection that reduces an overall resistance between the user and the item. Such approach may also be employed for data sources. For example, if the user searches for Salesforce® items, then the system can gradually make Salesforce® results more important.

Matching documents may provide additional information to the system in constructing a graph. If a user receives an email with an attachment and then uploads the attachment to a data storage system (e.g., Google Drive®), the system may compare hashes of those two documents. The system can then provide for a zero (or low) resistance to be placed between the user and each of the saved document and the email. Any additional interactions between the user and the document on the data storage system and/or the email can influence a resistance in a connection between the user and the email and the user and the document on the data storage system. For example, if the user accesses the document on the data storage system more frequently than the email, then the system can raise the resistance of the connection between the user and the email with respect to the resistance of the connection between the user and the document on the data storage system.

In some cases, a hash can be a hash of bytes of the document (or other data) that, if two documents are exactly the same, can be the same hash of bytes. It can be a mechanism to (i) detect if a document (e.g., email attachment) is the same as another document at a given location, such as a data storage unit (e.g., Box®), and (ii) create an "equality" (zero weight) connection between the documents. This can permit the documents get the benefits of their connections. The system can employ a shingling hash to detect documents (or other data) that are similar, but not exactly the same.

The present disclosure provides for additional scoring and/or resistance revision during an iterative map-reducing operation based on an age of a document, a recipient and/or sender of a document, and/or one-way communications. For example, document connections may age and when recently touched or emailed, may rank higher, whereas after a period of time, for example two weeks, the documents may steadily decrease in importance and/or alternatively revert to a standard or default resistance. If a recipient or sender is a particularly important person to a user (e.g., the user frequently communicates with the sender), then documents and/or emails sent to or received by that sender may rise in importance by reducing the resistance values assigned to connections to those documents or emails. One-way communications, for example notifications (e.g., Twitter® feeds) may be identified by the system and downgraded in importance by increasing an associated resistance, in recognition of the fact that a large number of one-way notifications may not imbalance a ranking of documents.

The modifications described herein may be implemented in various ways consistent with the present technology. For instance, the resistance itself may be modified, or a secondary scoring system may be used to incorporate the variations. In some examples, a graph may be set up so that the actual edge resistance is not affected, but the final score is modified by implementing a formulaic modification of the graph resistance reduction, or any other intermediary calculation in determining the resistances.

Methods of the present disclosure may be implemented by way of applications executed on computer systems. An application may be a mobile application, and/or may be used on mobile electronic device, such as a laptop personal computer (PC), smartphone or personal digital assistant (PDA), and may be downloadable or web-based.

Figure 4:
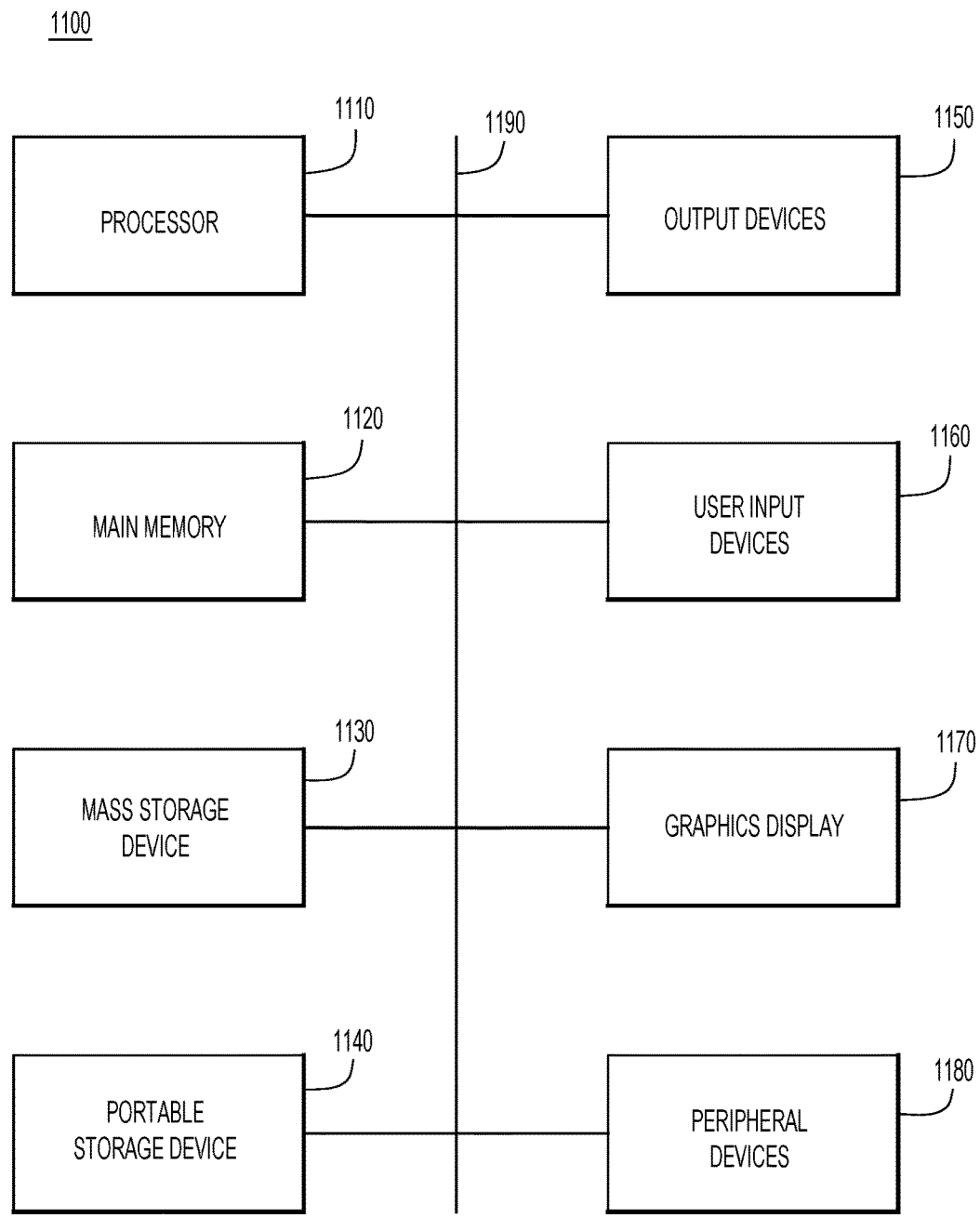
FIG. 4 shows another computer system that is programmed or otherwise configured to implement methods provided herein.

FIG. 4 illustrates an example computing system 1100 (also "system" herein) that may be used to implement embodiments of the present disclosure. The system 1100 may include one or more computer processors 1110 and main memory 1120. Main memory 1120 can store, at least in part, instructions and data for execution by the processor 1110. The main memory 1120 may store the executable code when in operation. The system 1100 may further include a mass storage device 1130, portable storage device(s) 1140, output devices 1150, user input devices 1160, a graphics display 1170, and peripheral device(s) 1180.

The components shown in FIG. 4 are depicted as being connected via a single bus 1190, but as an alternative, multiple buses may be used. The processor 1110 and the main memory 1120 may be connected via a local microprocessor bus, and the mass storage device 1130, peripheral device(s) 1180, portable storage device 1140, and graphics (or electronic) display 1170 may be connected via one or more input/output (I/O) buses.

The mass storage device 1130, which may be implemented with a magnetic disk drive or an optical disk drive, can be a non-volatile storage device for storing data and instructions for use by processor 1110. Mass storage device 1130 may store the system software for implementing embodiments of the present invention for purposes of loading that software into main memory 1120.

Portable storage device 1140 can operate in conjunction with a portable non-volatile storage medium, such as a floppy disk, compact disk, digital video disc, or USB storage device, to input and output data and code to and from the system. The system software for implementing embodiments of the present invention may be stored on such a portable medium and input to the system 1100 via the portable storage device 1140.

The user input devices 1160 provide at least a portion of a user interface. User input devices 1160 can include one or more microphones, an alphanumeric keypad, such as a keyboard, for inputting alpha-numeric and other information, or a pointing device, such as a mouse, a trackball, stylus, or cursor direction keys. As an alternative or in addition to, user input devices 1160 can each include a touchscreen. The system 1100 can include output devices 1150. Suitable output devices include speakers, printers, network interfaces, and monitors (or electronic displays).

Graphics display 1170 may include a liquid crystal display (LCD) or other suitable display device. Graphics display 1170 receives textual and graphical information, and processes the information for output to the display device.

The system 1100 may include peripheral devices 1180 and any type of computer support device to add additional functionality to the computer system.

The components provided in the system 1100 may be those typically found in computer systems that may be suitable for use with embodiments of the present invention and are intended to represent a broad category of such computer components that are well known in the art. Thus, the system 1100 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Mac OS, Palm OS, Android, iOS (known as iPhone OS before June 2010), QNX, and other suitable operating systems.

Figure 5:
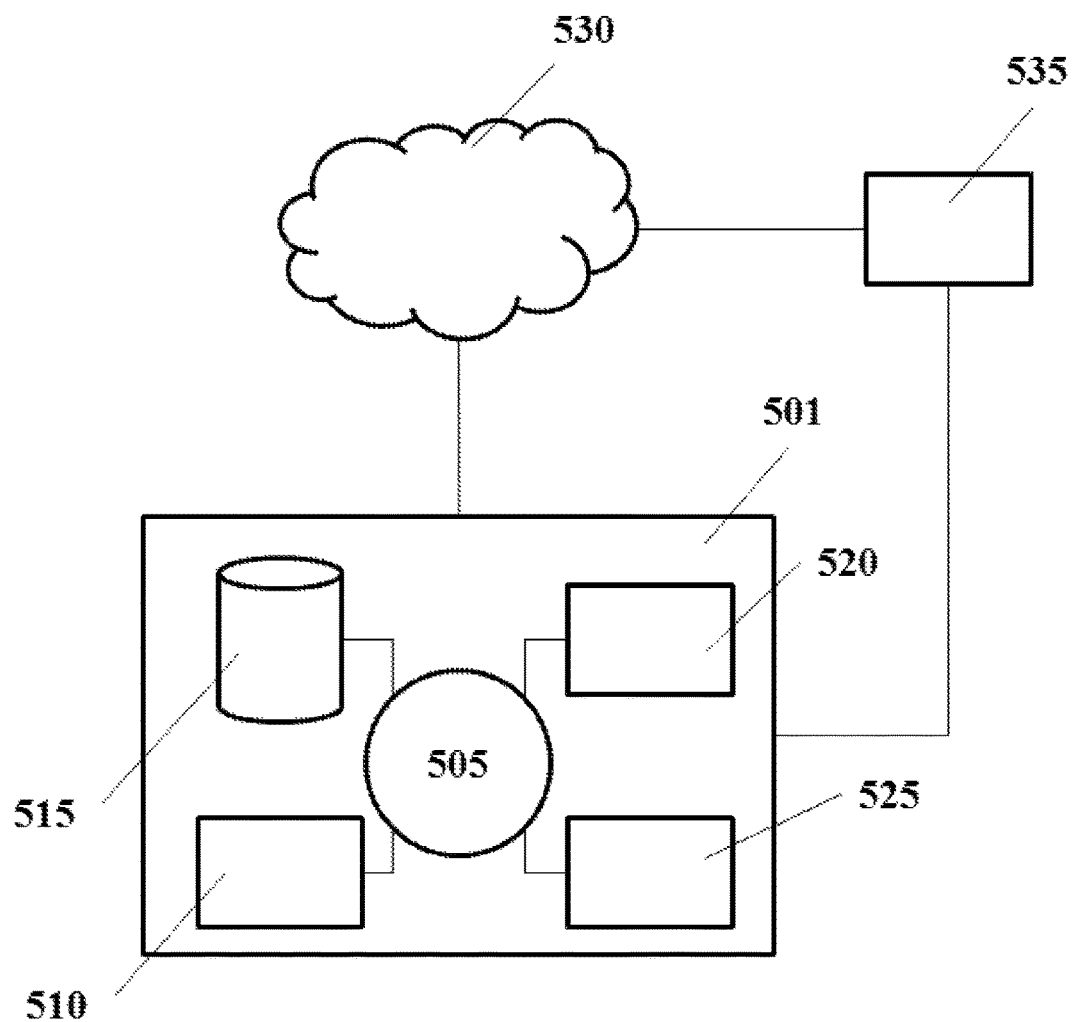
FIG. 5 shows another computer system that is programmed or otherwise configured to implement methods provided herein.

FIG. 5 shows another computer system 501 that is programmed or otherwise configured to implement methods of the present disclosure. The computer system 501 can be used to generate connections between documents or other electronic media, and update those connections.

The computer system 501 includes a central processing unit (CPU, also "processor" and "computer processor" herein) 505, which can be a single core or multi core processor, or a plurality of processors for parallel processing. The computer system 501 also includes memory or memory location 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The computer system 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the computer system 501, can implement a peer-to-peer network, which may enable devices coupled to the computer system 501 to behave as a client or a server.

The CPU 505 can execute a sequence of machine-readable instructions, which can be embodied in a program or software. The instructions may be stored in a memory location, such as the memory 510. Examples of operations performed by the CPU 505 can include fetch, decode, execute, and writeback.

The storage unit 515 can store files, such as drivers, libraries and saved programs. The storage unit 515 can store user data, e.g., user preferences and user programs. The computer system 501 in some cases can include one or more additional data storage units that are external to the computer system 501, such as located on a remote server that is in communication with the computer system 501 through an intranet or the Internet.

The computer system 501 can communicate with one or more remote computer systems. The computer system 501 can communicate with at least one remote computer system 535, such as through the network 530 or by direct connectivity. The remote computer system 535 can be the computer system of a user, such as a user wishing to search for documents (or other data). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 501 via the network 530.

Methods as described herein can be implemented by way of machine (e.g., computer processor) executable code stored on an electronic storage location of the computer system 501, such as, for example, on the memory 510 or electronic storage unit 515. The machine executable or machine readable code can be provided in the form of software. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 501 can include or be in communication with an electronic display that comprises a user interface (UI) for providing, for example, a visual display of connections between users and documents or other electronic media. Examples of UI's include, without limitation, a graphical user interface (GUI) and web-based user interface.

Methods and systems of the present disclosure can be implemented by way of one or more algorithms. An algorithm can be implemented by way of software upon execution by one or more computer processors. The software can be stored in memory coupled to the one or more computer processors.

In an example algorithm for generating a resistance graph, the system uses an arbitrary graph with undirected edges with weights greater than or equal to 0. Edges equal to zero can indicate equality, such as connections between the same documents stored in different locations (e.g., stored locally and stored in Box®). The graph is represented with a list of nodes, and each node has a list of edges that connect to the node. The given user is represented by a central node in the graph (0). This algorithm can produce a tree-like graph where all nodes connect to the central node with the edge weights being equal to the appropriate equivalent resistance values. Using this algorithm, the system can calculate the equivalent resistance between the user and all other nodes at the same time. In this algorithm, for an arbitrary graph input (g), a tree graph (r) is outputted, as follows:

```
while(number of nodes in g that only connect to 0 is < total number of nodes in g);
   resolveRings(g);
   resolveKites(g);
   g'=applyMapReduceProcedure(g);
   resolveParallelEdges(g');
   g=g';
r=g;
resolveRings(g):
   1. Detect ring;
      a. Find 0's neighbors;
      b. Find all edges whose nodes are 0's neighbors, but do not connect to 0;
      c. extract list of nodes from list in b;
      d. delete all nodes from c that repeat (solved using MapReduce);
      e. if result list from d is non-empty, a ring is identified;
   2. Delete edge with largest resistance in ring and not connecting to 0;
resolveKites(g): (e.g., solved using MapReduce);
   1. Detect kites;
      a. generate edge projection of graph (key, edge, node1(with all its edges), node2(with all its edges));
      b. group a. by key;
      c. for each edge e;
         count number of nodes that are neighbors of both endpoints n1 and n2;
      d. filter list in c. that share more than 1 neighbor;
   2. Resolve each kite with probability p;
      a. find the diagonal edge with endpoints n1, n2;
      b. For all shared neighbors n in the kite:
         add new edge e(n,n1) to g with resistance e(n,n2).resistance + diagonal.resistance;
         add new edge e(n,n2) to g with resistance e(n,n1).resistance + diagonal.resistance;
      c. delete diagonal edge from g;
      d. resolve parallel edges resulting from b;
applyMapReduceProcedure(g): (e.g., solved using MapReduce);
   for all nodes n not equal to 0;
      1. emit edges between any two of n's neighbors n1 and n2 (resistance of new edge is edge(n1,n).resistance + edge(n2,n).resistance);
      2. emit edge between n and 0 if n is a neighbor of 0 (resistance of new edge is same as resistance of old edge);
resolveParallelEdges(g'): (e.g., solved using MapReduce);
   for all edges e in g'; and
      if any two edges share the same endpoints, calculate their new resistance as (1/(1/r1+1/r2)), where r1 and r2 are edge weights of the two edges, and emit new edge.
```

Once the system has a resulting tree-like graph, the system can calculate equivalent resistances to nodes that are incrementally added to the graph. Once a new node (n) is added to the graph, appropriate connections to other nodes in the graph can be generated and the system can extract a subgraph that can extract all given paths from n to 0. This subgraph can include a list of parallel connections between n and 0, where each path is made of at most two edges. Thus, the system can calculate the resistance of these parallel paths, delete the new node with the new connections, and integrate the new node again into graph (e.g., only add an edge connecting to 0 with the newly calculated resistance). As a result, the system can get reasonable results for the resistance of the new node.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for searching for data, comprising:
   (a) accessing a data storage unit comprising data, wherein at least a subset of said data is associated with a user that is in an organization;
   (b) identifying connections that associate (i) data in said subset with said user, (ii) data in said subset with other data in said data storage unit, which other data is associated with one or more other users that are in said organization, (iii) said user with said one or more other users, and (iv) said user with said other data;
   (c) using a computer processor, assigning an initial resistance value to each connection identified in (b), which the initial resistance value is based on and inversely related to a strength of association between data and/or users associated with a given connection among said connections identified in (b);
   (d) generating a resistance graph identifying (i) said user, subset of said data, at least a portion of said other data and said one or more other users, and (ii) said connections identified in (b), said resistance graph containing connections in series and parallel;

(e) modifying the initial resistance value of each connection identified in (b) to produce a modified resistance value based on a frequency in which said user accesses said data in said subset, accesses said other data in said data storage unit, and communicates with said one or more other users;

(f) determining an overall resistance value (Req) of each connection based on the resistance graph and the modified resistance values (R1, ... Rn), wherein the overall resistance value (Req) of connections in series is calculated by the relationship Req=R1+ ... Rn, and the overall resistance value (Req) of connections in parallel is calculated by the relationship Req=1/{(1/R1)+ ... (1/Rn)};

(g) conducting a search of said data storage unit directed to search criteria provided by said user; and (h) providing results of said search, wherein said results are sorted based on said overall resistance values determined in (f).

2. The method of claim 1, wherein at least some but at most said subset of said data is associated with said user.

3. The method of claim 1, further comprising indexing said data based on the initial resistance value assigned to each of said connections identified in (b) and the modified resistance values determined for each of said connections identified in (b).

4. The method of claim 1, further comprising presenting said resistance graph on a user interface of an electronic device of said user.

5. The method of claim 1, wherein said results comprise at least a portion of said subset of said data.

6. The method of claim 5, wherein said results further comprise at least a portion of said other data in said data storage unit.

7. The method of claim 1, wherein in (h) providing, data associated with connections having lower overall resistance values are prioritized higher than data having higher overall resistance values.

8. The method of claim 7, wherein said results are provided in a list, and wherein (h) providing further comprises providing results of higher priority towards a top of said list.

9. The method of claim 1, wherein said organization is a group or business enterprise.

10. A method for searching for data, comprising:

(a) accessing a data storage unit comprising data, wherein at least a subset of said data is associated with a user that is in an organization;

(b) identifying connections that associate (i) data in said subset with said user, (ii) data in said subset with other data in said data storage unit, which other data is associated with one or more other users that are in the organization, (iii) said user with said one or more other users, and (iv) said user with said other data;

(c) using a computer processor, calculating and assigning initial resistance values to said connections identified in (b), which initial resistance values are each based on and inversely related to a strength of association between data and/or users associated with a given connection among said connections identified in (b);

(d) indexing said data based on said initial resistance values assigned in (c);

(e) generating a resistance graph identifying (i) said user, subset of said data, at least a portion of said other data and said one or more other users, and (ii) said connections identified in (b), said resistance graph containing connections in series and parallel;

(f) modifying the initial resistance value to each connection identified in (b) to produce a modified resistance value based on a frequency in which said user accesses said data in said subset, accesses said other data in said data storage unit, and communicates with said one or more other users;

(g) determining an overall resistance value (Req) of each connection based on the resistance graph and the modified resistance values (R1, ... Rn), wherein the overall resistance value (Req) of connections in series is calculated by the relationship Req=R1+ ... Rn, and the overall resistance value (Req) of connections in parallel is calculated by the relationship Req=1/{(1/R1)+ ... (1/Rn)};

(h) conducting a search of said data storage unit directed to search criteria provided by said user; and (i) providing results of said search, wherein said results are prioritized based on said overall resistance values determined in (g).

11. The method of claim 10, wherein at least some but at most said subset of said data is associated with said user.

12. The method of claim 10, further comprising providing said results on a user interface of an electronic device of said user.

13. The method of claim 10, wherein said results comprise at least a portion of said subset of said data.

14. The method of claim 13, wherein said results further comprise at least a portion of said other data in said data storage unit.

15. The method of claim 10, wherein in (i) providing, data associated with connections having lower overall resistance values are prioritized higher than data having higher overall resistance values.

16. The method of claim 15, wherein said results are provided in a list, and wherein providing (i) further comprises providing results of higher priority towards a top of said list.

17. The method of claim 10, wherein said organization is a group or business enterprise.

18. A computer readable medium comprising machine executable code that, upon execution by one or more computer processors, implements a method for searching for data, the method comprising:

(a) accessing a data storage unit comprising data, wherein at least a subset of said data is associated with a user that is in an organization;

(b) identifying connections that associate (i) data in said subset with said user, (ii) data in said subset with other data in said data storage unit, which other data is associated with one or more other users that are in said organization, (iii) said user with said one or more other users, and (iv) said user with said other data;

(c) using a computer processor, assigning an initial resistance value to each connection identified in (b), which the initial resistance value is based on and inversely related to a strength of association between data and/or users associated with a given connection among said connections identified in (b);

(d) generating a resistance graph identifying (i) said user, subset of said data, at least a portion of said other data and said one or more other users, and (ii) said connections identified in (b), said resistance graph containing connections in series and parallel;

(e) modifying the initial resistance value to each connection identified in (b) to produce a modified resistance value based on a frequency in which said user accesses said data in said subset, accesses said other data in said data storage unit, and communicates with said one or more other users;

(f) determining an overall resistance value (Req) of each connection based on the resistance graph and the modified resistance values (R1, . . . Rn), wherein the overall resistance value (Req) of connections in series is calculated by the relationship Req=R1+ . . . Rn, and the overall resistance value (Req) of connections in parallel is calculated by the relationship Req=1/{(1/R1)+ . . . (1/Rn)};

(g) conducting a search of said data storage unit directed to search criteria provided by said user; and (h) providing results of said search, wherein said results are sorted based on said overall resistance values determined in (f).

19. A computer readable medium comprising machine executable code that, upon execution by one or more computer processors, implements a method for searching for data, the method comprising:

(a) accessing a data storage unit comprising data, wherein at least a subset of said data is associated with a user that is in an organization;

(b) identifying connections that associate (i) data in said subset with said user, (ii) data in said subset with other data in said data storage unit, which other data is associated with one or more other users that are in said organization, (iii) said user with said one or more other users, and (iv) said user with said other data;

(c) using a computer processor, calculating and assigning initial resistance values to said connections identified in (b), which the initial resistance values are each based on and inversely related to a strength of association between data and/or users associated with a given connection among said connections identified in (b);

(d) indexing said data based on said initial resistance values assigned in (c);

(e) generating a resistance graph identifying (i) said user, subset of said data, at least a portion of said other data and said one or more other users, and (ii) said connections identified in (b), said resistance graph containing connections in series and parallel;

(f) modifying the initial resistance value to each connection identified in (b) to produce a modified resistance value based on a frequency in which said user accesses said data in said subset, accesses said other data in said data storage unit, and communicates with said one or more other users;

(g) determining an overall resistance value (Req) of each connection based on the resistance graph and the modified resistance values (R1, . . . Rn), wherein the overall resistance value (Req) of connections in series is calculated by the relationship Req=R1+ . . . Rn, and the overall resistance value (Req) of connections in parallel is calculated by the relationship Req=1/{(1/R1)+ . . . (1/Rn)};

(h) conducting a search of said data storage unit directed to search criteria provided by said user; and (i) providing results of said search, wherein said results are prioritized based on said overall resistance values determined in (g).

20. The computer readable medium of claim 18, wherein in (h) providing, data associated with connections having lower overall resistance values are prioritized higher than data having higher overall resistance values.

21. The computer readable medium of claim 19, wherein in (i) providing, data associated with connections having lower overall resistance values are prioritized higher than data having higher overall resistance values.

* * * * *